United States Patent [19]
Fox

[11] Patent Number: 5,109,421
[45] Date of Patent: Apr. 28, 1992

[54] FETAL SPEAKER SYSTEM AND SUPPORT BELT FOR MATERNAL WEAR

[76] Inventor: Douglas C. Fox, 14046 Chandler Blvd., Van Nuys, Calif. 91401

[21] Appl. No.: 560,805

[22] Filed: Jul. 31, 1990

[51] Int. Cl.⁵ .............................................. H04R 1/02
[52] U.S. Cl. .......................................... 381/90; 2/338
[58] Field of Search ................ 381/124, 90, 188, 151, 381/205, 187, 24; 128/775, 662.04, 660.1; 2/104, 115, 338; 450/79, 80, 85

[56] References Cited

U.S. PATENT DOCUMENTS

| | | | |
|---|---|---|---|
| 4,070,553 | 1/1978 | Hass | 381/24 |
| 4,589,134 | 5/1986 | Waldron | 381/24 |
| 4,781,200 | 11/1988 | Baker | 128/775 |
| 4,825,471 | 5/1989 | Jennings | 2/115 |

Primary Examiner—Forester W. Isen
Assistant Examiner—Sylvia Chen

[57] ABSTRACT

A fetal speaker system and support belt of the present invention includes a belt like housing, a pair of low volume speakers mounted spaced apart, and a casing with a resilient padding material therein. The belt fastens around the abdomen and adjusts accordingly to the growing belly. A radio or other audio transmitting device is maintained in position by a sturdy sleeve on the side of the belt. The electrical conductor connecting the plug to the speakers is mounted within the casing such that the wires do not interfere with the belt wearer. The belt offers sturdy yet stain resistant material for the exterior and a comfortable soft cloth on the interior side to be worn on bare skin if desired. The material is available in a wide variety of fashionable colors and can be designed according to the individual's specifications.

2 Claims, 2 Drawing Sheets

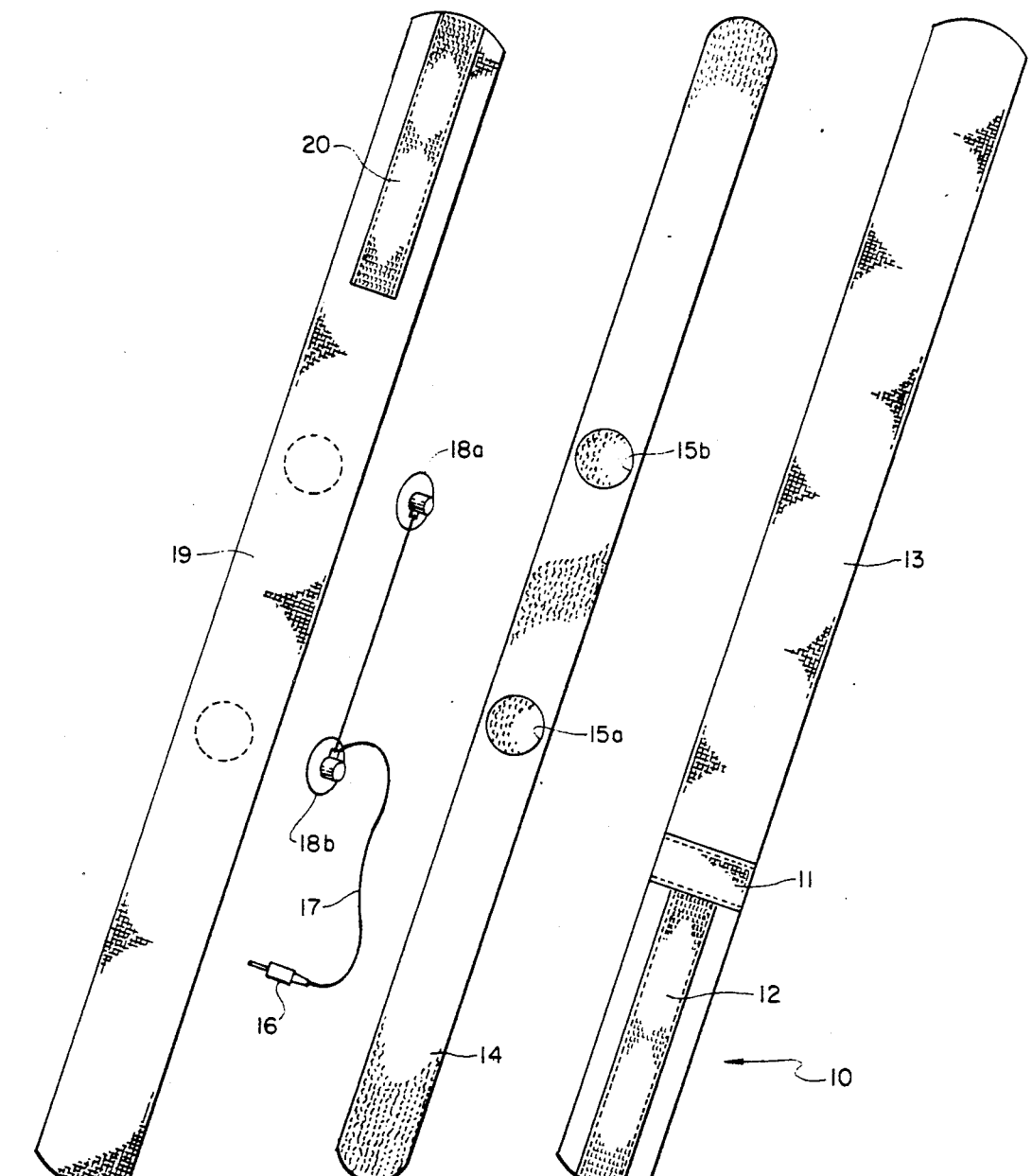
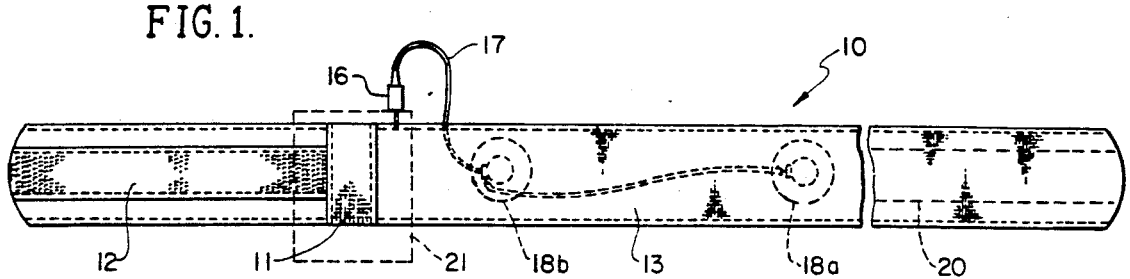
FIG. 1.
FIG. 2.

FETAL SPEAKER SYSTEM AND SUPPORT BELT FOR MATERNAL WEAR

BACKGROUND OF THE INVENTION

1. 1. Field of the Invention

The present invention relates generally to personal stereo speaker systems, and more particularly to a combination sound system for a fetus and a support belt for the mother.

2. Brief Description of the Prior Art

Prior to the present invention, there have existed a number of patents directed to personal sound systems. The most common are the headphones style, whereas the speakers are held to the head by a band. Other variations, in a like manner attach the speakers to a garment in the vicinity of the ears, usually the shoulders or the upper torso.

While personal sound systems are satisfactory for playback of radio/stereo sounds, a more directional sound system is needed for transmitting the low volume modulation sound waves to the fetus in the womb. The present invention satisfies this need.

It is important to provide a pregnant mother with a means to lovingly interact with her developing baby. Recently science has proven that the fetus can hear sounds outside the womb from as early as four months. Whereas, up until this fact was proven mothers believed maintaining the proper health and nutrition needed for a growing fetus was just about all they could do for it. The sound system of the present invention was designed with the recipient in mind being a fetus in the womb of its mother.

Therefore, a long standing need has existed to provide a comfortable and convenient belt support for mounting a fetal speaker system about the waist of a pregnant women.

SUMMARY OF THE INVENTION

Accordingly, the problems and difficulties encountered by conventional speaker systems are avoided by my invention which provides an elongated belt having opposite ends detachably connected together by a hook and pile fastener, a pair of stereo speakers are disposed in the construction of the belt about midway between it's opposite ends so as to be critically located adjacent to the developing fetus. Signal carrying cable as well as a plug in connector operably carried in the belt adjusted for connection with a signal transmitting source.

Although the main objective is to educate and entertain the fetus, my invention has many important advantages for the mother. The mother will find that the support belt offers her extra support for her abdomen, while at the same time fostering good posture and added back comfort, both of which are very important during pregnancy.

While the present invention benefits the baby the most as an aid to producing a happy, intelligent, more alert baby it also affords the mother with a valuable soothing device to help quiet an upset baby. Studies have shown that the babies, while listening to tapes made of the sounds in the womb, calmed down faster then when they were not played the tapes. Therefore, the same tapes played to the baby before it was born can also be used after birth to soothe, educate, and entertain the baby. Perhaps an early beginning, paving the way for feelings of enthusiasm for future education. Another advantage for the mother is the fact that the present invention can be inexpensively fabricated, thereby encouraging widespread use with easy affordablity, at the same time being durable and longlasting requiring replacement only under exceptional circumstances.

The design of the fetal sound system provides the stereo sound for the womb. A pair of transducers, transducers in this case being a pair of 2½" low volume speakers were utilized for the protection of the maturing fetal ears. This feature also provides an absence of any noise from the belt to interefere with the mother's socializing, working at the office, etc... The lightweight, readily portable belt adjusts securely around the abdomen to provide easy mobility.

Further objects and advantages of my invention will become apparent from a consideration of the drawings and ensueing description, and it is to be understood that the invention is not limited to the particular embodiment shown in the accompanying drawing.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is an exploded view of the system of the present invention displaying the seperate components and how they combine to form the entity;

FIG. 2 is a front elevational view outlining the position of the components on the belt;

DESCRIPTION OF THE PREFERRED EMBODIMENT

Figure 3:
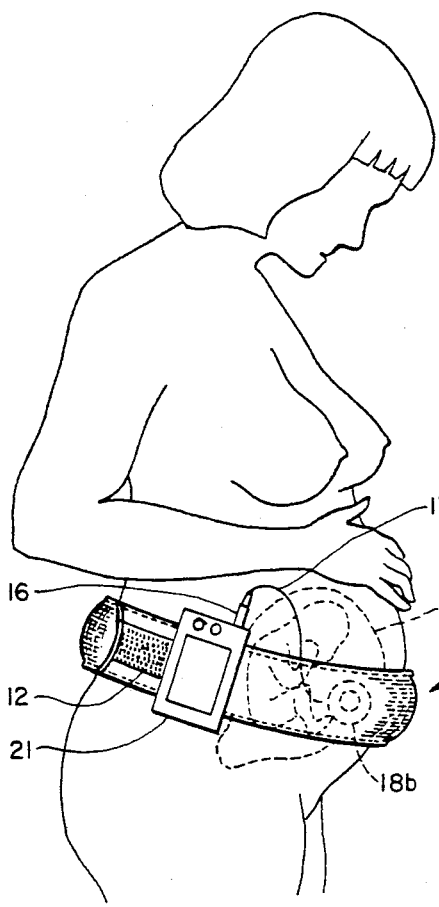
FIG. 3 is a perspective view of the fetal speaker system and support belt of the present invention showing the way in which the belt transmits stereo sound to the womb while at the same time fostering good posture.

Referring now to the drawings in which similar or corresponding parts are identified by the same reference numeral throughout the drawings.

Referring to FIG. 1, the speaker system of the present invention is broadly denoted by the numeral 10 and includes transducers 18a and 18b, said transducers in this case being 2½" low volume stereo speakers, but may be of any convenient size as desired by the user. Incorporated inside the belt are pockets 15a and 15b for the purpose of isolating and securing the speakers in strategic locations on the belt for maximum benefits. Electrical leads or cable 17 interconnects the left and right speakers to a plug 16 that fits into an energy source 21, said energy source in this case being a personal stereo. A reinforced nylon sleeve 11 can be of any suitable material, typically it is of a fabric material to provide strength to the sleeve. The sleeve is of a size to receive and contain the energy source. A fastener is used, in this case being a hook type 12, to join one end of the elongated belt to the opposite end fastener being a pile type 20. Any suitable adjustable fastener can be used for this purpose, if desired.

The fabric casing 13 and 19 can be of any suitable material, typically they are of a fabric material which can be stitched. The exterior flexable cover 13 in this case being a sturdy, stain resistant type nylon fabric. The interior flexable cover 19 in this case being of a soft, comfortable, cloth for purposes of illustration, terry cloth material was used. The width of the material can be adapted to accommodate different preferences, for example the width can be 3 inches. Contained within the casing is a layer of resilient padding 14. This insulation serves to hold the respective conductors in position and provide the support and comfort needed for the lower back and abdomen.

Referring now to FIG. 2, here the belt is more clearly illustrated as a unit. Generally the energy source 21 coupled to the plug 16 and the electrical cable 17 are held to the right side of the belt by the reinforced nylon 11 for right handed women and modified accordingly for left handers, by relocating the energy source and its subsequent components to the left side of the belt. The overlapping hook fastener 12 and pile fastener 20 of generous purportions to allow plenty of room for the belly to grow.

Referring to FIG. 3, the fetal speaker system and support belt of the present invention is shown wrapped around the waist of a pregnant women fastened by a hook 12 and pile 20 connector. The placement of the belt by the user in a position which provides the most support and added comfort to the lower back and abdomen. The energy source 21, electrical cable 17, and plug 16 positioned on the belt to be conveniently easy to operate yet does not interefere with body movements.

Figure 4:
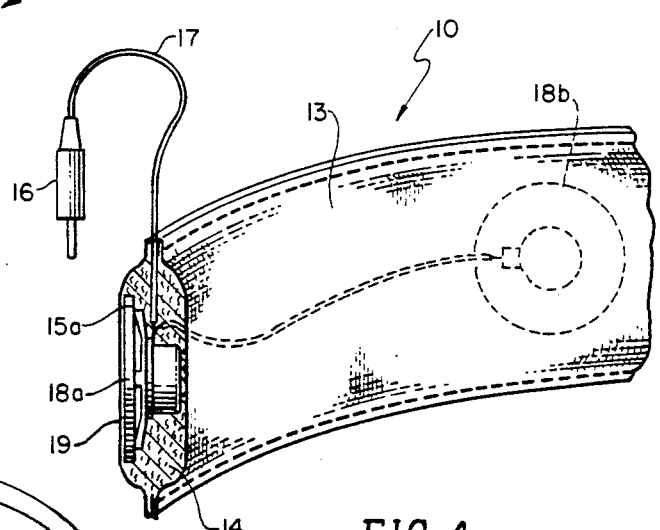
FIG. 4 is an enlarged fragmentary cross-sectional view of the speaker system shown in FIG. 3 showing the way in which one of the stereo speakers is mounted in the speaker pocket.
Figure 5:
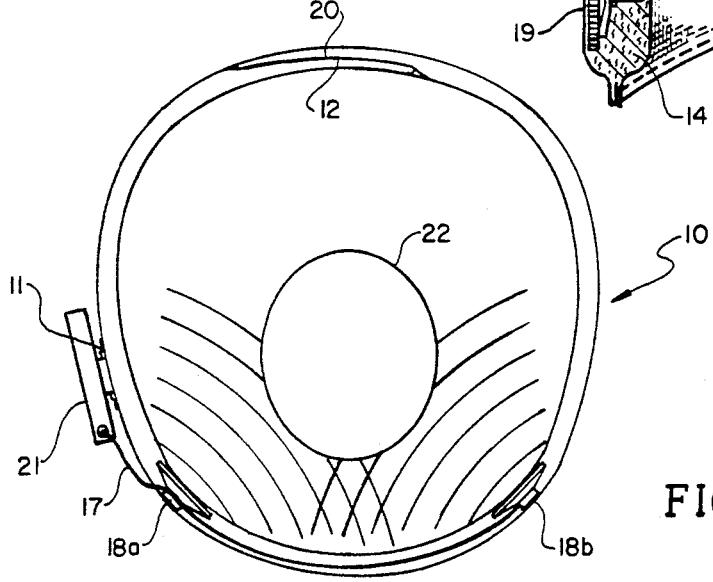
FIG. 5 is a diagram illustrating the strategic location of the speakers and the overlapping sound waves as they cross the fetal target area.

Referring now to FIG. 4 and 5, show a transducer 18a, said transducer being a stereo speaker sitting securely in a pocket 15a, such as illustrated in FIG. 4, made from flexable material sewn to the inside of the interior covering 19. A layer of resilient padding 14 protects the speaker and ensures the proper insulation needed to keep any noises from escaping from the belt to interefere with her environment. The speakers 18a and 18b are secured at a set distance, in this case being approximately 8" apart, as shown in FIG. 5, provide the stereo sound needed which will reach the fetus in any area of the womb. FIG. 5 illustrates the fetal target area 22 being the center and shows the sound waves as they would overlap when the speakers are at this angle and this distance on the belt.

In view of the foregoing, it can be seen that the inventive concept, system 10 provides a means for educating and entertaining the fetus inside the mother. The system allows the energy source to be easily worn on the belt at the waist of the user of the system. While the mother plays her fetal speaker system of the present invention no sounds can be heard outside the belt to interefere with the mothers surroundings. The system is readily adjustable for persons of different sizes. The system can be worn securely while sitting, walking, or otherwise moving about Whereas the invention has been shown and described in connection with the perferred embodiment thereof, it will be obvious to those skilled in the art that many modifications, substitutions and additions may be made without departing from this invention in its broader aspects. Accordingly the scope of the invention should be determined not by the embodiments illustrated but by the appended claims and their legal equivalents and therefore the aim in the appended claims is to cover all such changes and modifications as fall within the true spirit and scope of this invention. It can be seen that the fetal speaker system of the present invention fulfills all of the above stated objectives.

What is claimed is:

1. A fetal speaker system and support belt for maternal wear comprising the combination of:
   an elongated support belt having opposite ends detachably connected by an adjustable fastener;
   said support belt being of a sturdy flexible material casing having a pair of pockets and including resilient padding material enclosed therein;
   said support belt housing a pair of transducers being speakers mounted in said pockets attached to the inside of said support belt adapted to contain said transducers in position on said support belt;
   electrical circuitry operably connected to said transducers mounted within said support belt and extending within said padding to terminate at a predetermined location on said support belt;
   an electronic signal generating device;
   an electrical connector mounted on the end of said electrical circuitry and extending outwardly through said support belt casing for connection to said electronic signal generating device such that energy signals will be generated to said transducers when connected to said connector means;
   means for removably mounting said signal generating device on said support belt located on said belt casing adjacent to said electrical connector means;
   said means for removably mounting said signal generating device includes a sleeve-like housing adapter to receive and contain said signal generating device in position on said belt when fastened thereto;
   said support belt having opposite ends securely fastened and adjusted to properly fit and extra support for lower back area; and
   said support belt including said resilient padding providing insulation to protect against sounds emitting from the exterior side of said belt casing to be heard by anyone other than the intended fetus.

2. The invention as defined in claim 1 including:
   said support belt constructed of lightweight to strength ratio materials being attached securely and unobtrusively and further providing convenience and easy mobility.

* * * * *